United States Patent
Ive et al.

(10) Patent No.: US 12,496,903 B2
(45) Date of Patent: Dec. 16, 2025

(54) CONTENT DISPLAY DEVICE FOR ROAD VEHICLE AND RELATIVE ROAD VEHICLE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Patrizio Moruzzi, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 79 days.

(21) Appl. No.: 18/498,473

(22) Filed: Oct. 31, 2023

(65) Prior Publication Data

US 2024/0149673 A1 May 9, 2024

(30) Foreign Application Priority Data

Nov. 4, 2022 (IT) .................... 102022000022650

(51) Int. Cl.
*B60K 35/00* (2024.01)
*B60K 35/22* (2024.01)
(Continued)

(52) U.S. Cl.
CPC .............. *B60K 35/00* (2013.01); *B60K 35/22* (2024.01); *B60K 35/53* (2024.01); *B60K 35/654* (2024.01);
(Continued)

(58) Field of Classification Search
CPC ...... B60K 35/22; B60K 35/53; B60K 35/654; B60K 35/656; B60K 35/658; B60K 35/81;
(Continued)

(56) References Cited

U.S. PATENT DOCUMENTS 6,007,036 A 12/1999 Rosen et al.
11,235,710 B1 2/2022 Shumaker
(Continued)

FOREIGN PATENT DOCUMENTS

DE 102005001963 A1 12/2005
EP 2914458 B1 10/2020
GB 2541224 A 2/2017

OTHER PUBLICATIONS

Italian Search Report for Application No. 202200022650; Filing Date: Nov. 4, 2022; Date of Mailing: May 4, 2023; 6 pages.

*Primary Examiner* — Farzana Hossain
(74) *Attorney, Agent, or Firm* — CANTOR COLBURN LLP

(57) ABSTRACT

A content display device for a road vehicle; the content display device comprising a support element configured to be mounted centrally at a dashboard of the road vehicle; at least one screen, mechanically connected to the support element and configured to be visible to a passenger and/or a driver while driving; a movement system hinged to the support element and hingeble to the dashboard for alternately rotating the screen towards the driver and/or towards the passenger.

11 Claims, 11 Drawing Sheets

(51) Int. Cl.
*B60K 35/53* (2024.01)
*B60K 35/65* (2024.01)
*B60K 35/81* (2024.01)

(52) U.S. Cl.
CPC .......... *B60K 35/656* (2024.01); *B60K 35/658* (2024.01); *B60K 35/81* (2024.01)

(58) Field of Classification Search
CPC ..... B60K 35/10; B60K 35/00; B60R 11/0235; B60R 2011/0005; B60R 2011/0085
See application file for complete search history.

(56) References Cited

U.S. PATENT DOCUMENTS

| | | | |
|---|---|---|---|
| 2006/0249632 A1* | 11/2006 | McKelvey | B60R 11/02 224/539 |
| 2011/0132945 A1 | 6/2011 | Bonito et al. | |
| 2013/0076496 A1* | 3/2013 | Masuda | B60R 11/02 340/425.5 |
| 2015/0138448 A1* | 5/2015 | Rawlinson | B60N 2/22 348/837 |
| 2019/0176626 A1* | 6/2019 | Akaike | B60N 3/001 |
| 2023/0401025 A1* | 12/2023 | Liu | B60K 35/81 |

\* cited by examiner

CONTENT DISPLAY DEVICE FOR ROAD VEHICLE AND RELATIVE ROAD VEHICLE

CROSS-REFERENCE TO RELATED APPLICATIONS

This patent application claims priority from Italian patent application no. 102022000022650 filed on Nov. 4, 2022, the entire disclosure of which is incorporated herein by reference.

TECHNICAL FIELD

The present invention concerns a content display device for a road vehicle and a relative road vehicle.

In particular, the present invention is advantageously, but not exclusively, applied in a content display device for a high-performance road vehicle, to which the following description will explicitly refer without loss of generality.

BACKGROUND TO THE INVENTION

Generally, road vehicles are provided with a plurality of display devices arranged on the dashboard of the road vehicle.

Historically, each road vehicle comprises at least one display device for the driver, for example the screens or indicators arranged on the vehicle instrument panel, namely on the portion of dashboard interposed between the steering wheel and the windscreen.

In recent years, said devices can be assisted by other screens (for example at least one screen arranged centrally on the dashboard or a head-up display) which complete display of the information for the driver.

In general, the arrangement of an increasingly large central screen is becoming increasingly popular, especially in fully electric cars; however, in the majority of cases, said central screens are exclusively provided with touch controls, which during sports car driving (for example on the track) make it difficult, if not impossible, to select a function without distracting the driver. Furthermore, said screens are generally integral with the dashboard and therefore, whilst they are visible both to the driver and to the passenger, they do not provide an optimal view of the information for either of them both in terms of perspective and due to possible reflections (for example caused by the sun or the headlights of another vehicle), which considerably reduce the rapidity with which the driver can read said information.

In addition, although devices have been developed designed to be visible also to the passengers of road vehicles, said devices are generally associated with the rear seats, since it is difficult for a passenger sitting in the front seat, alongside the driver, to view distracting content such as films, documentaries, news, etc. without distracting the driver. For this reason, it is difficult for the front passenger to view distracting content via the central screen.

In recent years, to overcome the problem of driver distraction, the front passenger is allowed to view distracting content only with the vehicle at a standstill. During driving, on the other hand, the front passenger is allowed to view only content deemed to be non-distracting, for example the speed, route or other contents that aid driving (such as the current gear, lateral accelerations) which, for example, the driver can view via other screens.

However, said solutions limit the entertainment of the front passenger (namely the passenger sitting alongside the driver), reducing the pleasure of the ride.

In general, therefore, the need is felt to increase the flexibility of the vehicle display systems, allowing the driver to read the information more rapidly and, at the same time, enabling the passenger to view distracting content.

The document U.S. Ser. No. 11/235,710B1 describes a bracket and an assembly device for a fixed touchscreen display of a Tesla vehicle, enabling it to rotate and/or tilt to be positioned where required for viewing by one or both the vehicle users.

The document EP2914458B1 describes a device for the support of rectangular devices such as tablets or smartphones.

The document US2011132945A1 describes an assembly system for a golf cart for fixing a display device to the housing of the golf cart so that the display device is movable to facilitate the viewing of a display device screen by a user, whether the user is inside or outside the golf cart.

The document U.S. Pat. No. 6,007,036A describes a stowable support apparatus that comprises an elongate horizontally oriented track with a slide mounted and reciprocally movable thereon.

The document GB2541224A describes a cosmetic mirror assembly for the inside of the passenger compartment of a vehicle, for example in a door of the vehicle.

DESCRIPTION OF THE INVENTION

The object of the present invention is to provide a content display device for a road vehicle and a relative road vehicle which are at least partially exempt from the drawbacks described above and, at the same time, are simple and inexpensive to produce.

According to the present invention, a content display device for a road vehicle and a relative road vehicle are provided as claimed in the following independent claims and, preferably, in any one of the claims depending directly or indirectly on the independent claims.

The claims describe preferred embodiments of the present invention forming an integral part of the present description.

BRIEF DESCRIPTION OF THE DRAWINGS

Below, some embodiments of the invention will be described for a better understanding thereof by way of non-limiting example and with reference to the attached drawings in which.

Embodiments of the Invention

Figure 1:
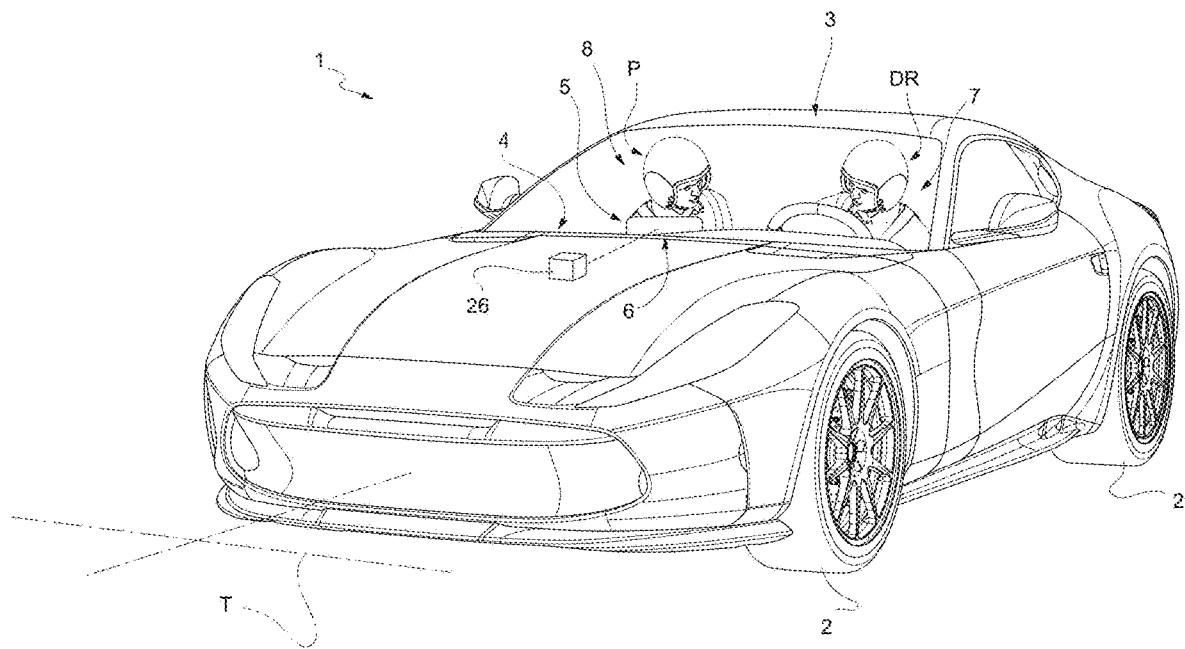
FIG. 1 is a perspective and schematic view, with details removed for clarity, of a possible embodiment of a road vehicle in accordance with the present invention.

In FIG. 1, the number 1 indicates overall a road vehicle provided with two front wheels 2 and two rear wheels 2 (in particular driving wheels). The vehicle 1 is provided with a passenger compartment 3 which is adapted to house at least one driver DR and preferably one or more passengers P, of which at least one alongside the driver DR as illustrated in FIG. 1.

The same reference numbers and letters in the figures identify the same elements or components with the same function.

In the context of the present description the term "second" component does not imply the presence of a "first" component. Said terms are employed as labels to improve clarity and should not be understood in a limitative manner.

The elements and the characteristics illustrated in the different preferred embodiments, including the drawings, can be combined with or isolated from one another without departing from the protective scope of the present application as described below.

Furthermore, the road vehicle 1 comprises a frame (of known type and therefore not illustrated in detail), and a vehicle dashboard 4 inside the passenger compartment and fixed to the frame. The vehicle dashboard 4 is arranged frontally to the driver DR and to any passenger P.

As illustrated in the non-limiting embodiments of the attached figures, the road vehicle 1 comprises a content display device 5, which is arranged on the vehicle dashboard 4, in particular on a central portion 6 of the vehicle dashboard 4 between a driving position 7 and a passenger position 8.

The content display device 5 comprises a support element 9, which is configured to be mounted on the central portion 6. The support element 9, in other words, determines the main structure of the content display device 5, namely the portion on which the other components of the device 5 are mounted/assembled.

Furthermore, the display device 5 comprises a screen 10, which is mechanically connected to and preferably integral with the support element 9 and is configured to be visible to the driver DR and/or to the passenger P. The screen 10 is of known type (for example liquid crystal and preferably a touchscreen) and therefore is not further described below.

Advantageously, the content display device 5 comprises a movement system 11 which is, on one side, hinged to the support element 9 and, on the other, hinged to the dashboard 4 to alternately rotate the screen 10 towards the driver DR and/or towards the passenger P.

Figure 2:
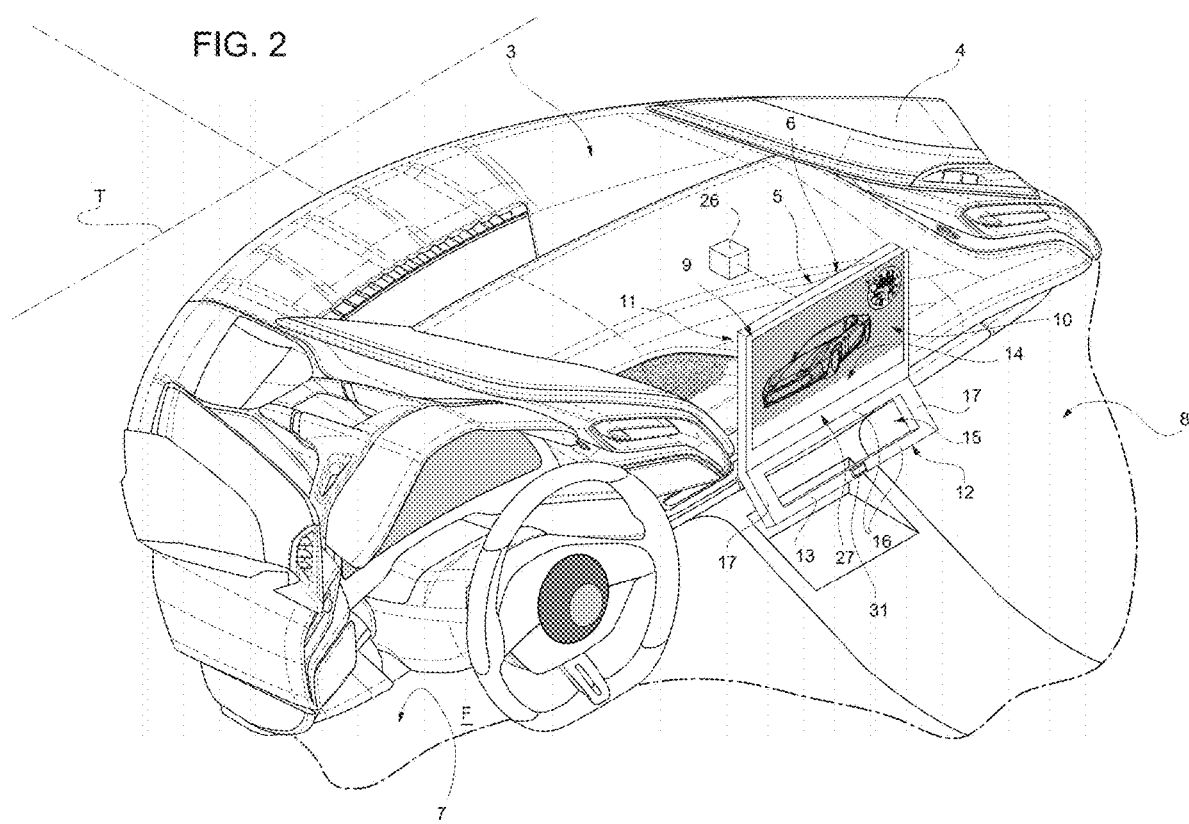
FIG. 2 is a perspective schematic view of part of the interior of the passenger compartment of FIG. 1 in which a central display device can be seen in a first position.
Figure 3:
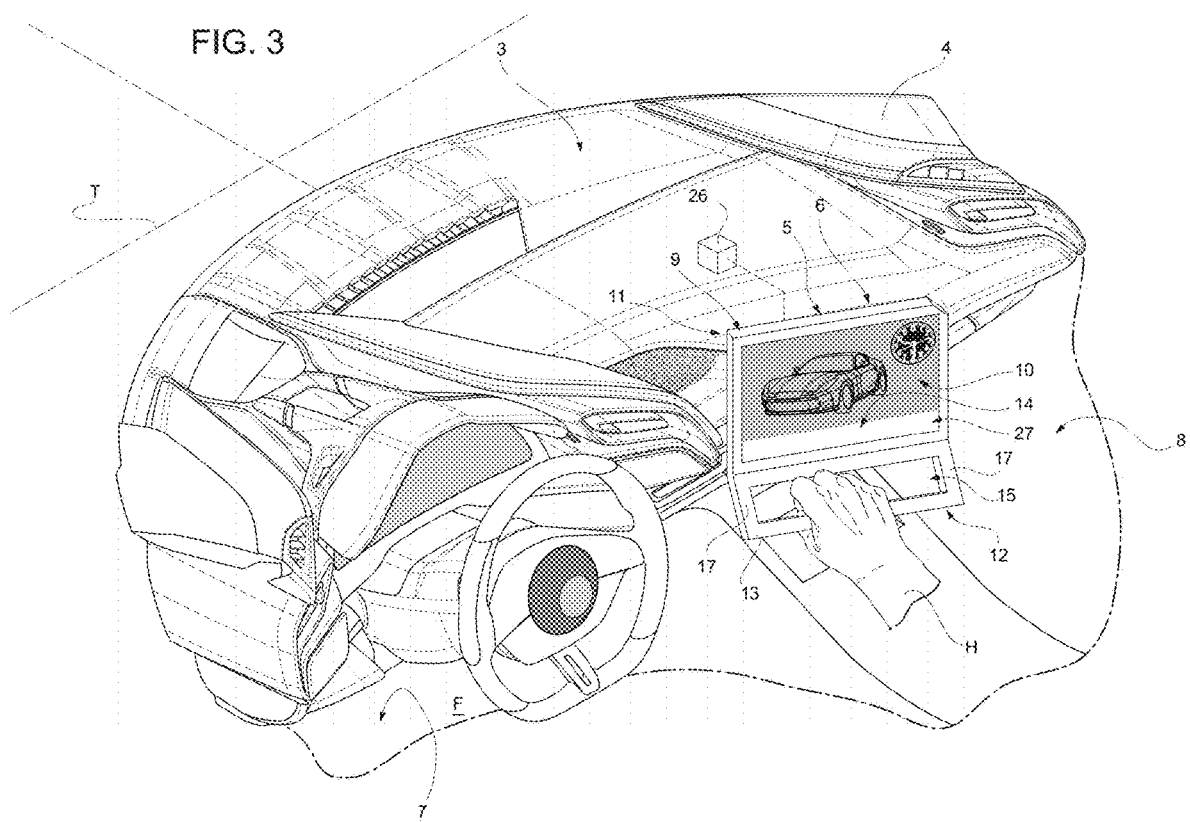
FIG. 3 is a perspective schematic view of part of the interior of the passenger compartment of the vehicle of FIG. 1 in which the central display device of FIG. 2 can be seen in a second position.
Figure 4:
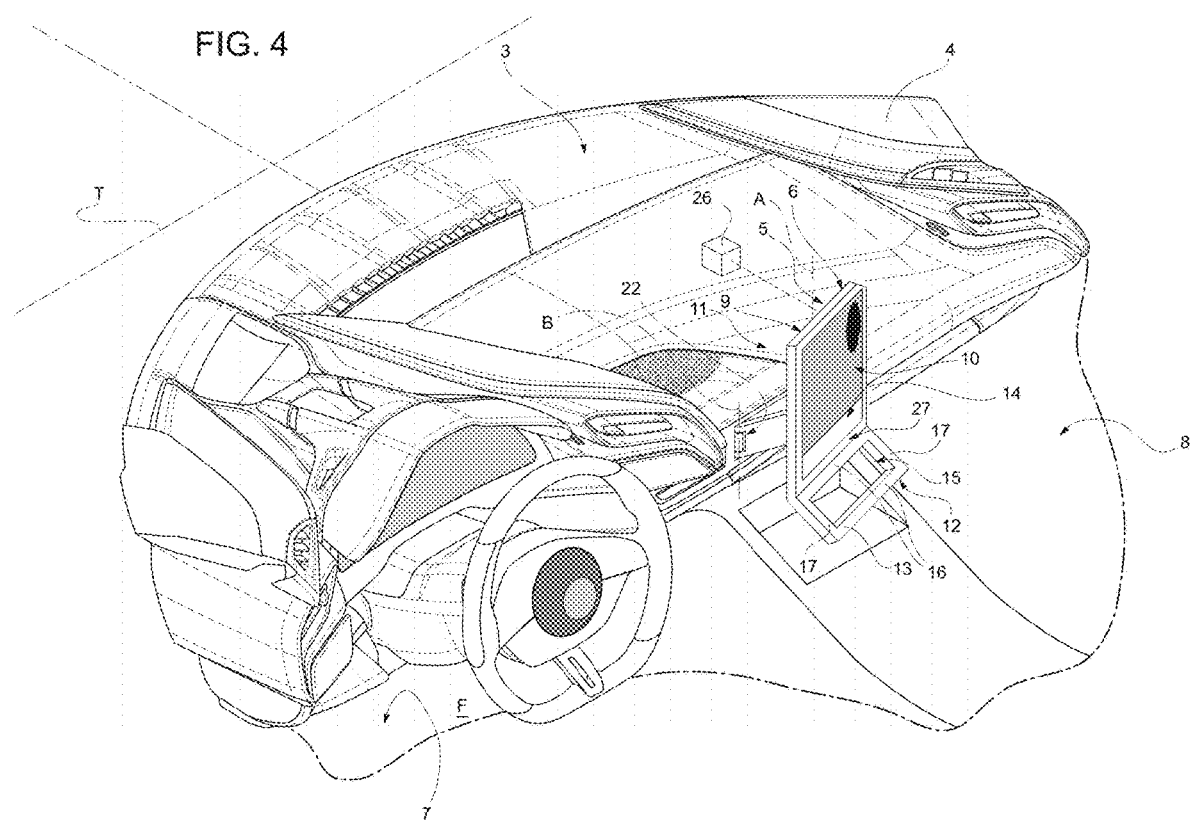
FIG. 4 is a perspective schematic view of part of the interior of the passenger compartment of the vehicle of FIG. 1 in which the central display device of FIG. 2 can be seen in a third position.

In particular, the movement system 11 is any mechanism that allows the support element 9 and therefore the screen 10 to pass from a first configuration in which the screen 10 is parallel to a transverse axis T of the road vehicle 1 (namely the configuration of FIG. 2), to at least one second configuration in which the screen 10 is inclined towards the driver DR (as illustrated in FIG. 3) and/or to a third configuration in which the screen 10 is inclined towards the passenger P (as illustrated in FIG. 4).

In particular, therefore, the movement system 11 is configured to rotate the support element 9 around an axis A, B at least partially transverse (in particular substantially perpendicular or in any case at an angle of at least 70°) relative to a floor F of the road vehicle 1.

Figure 10:
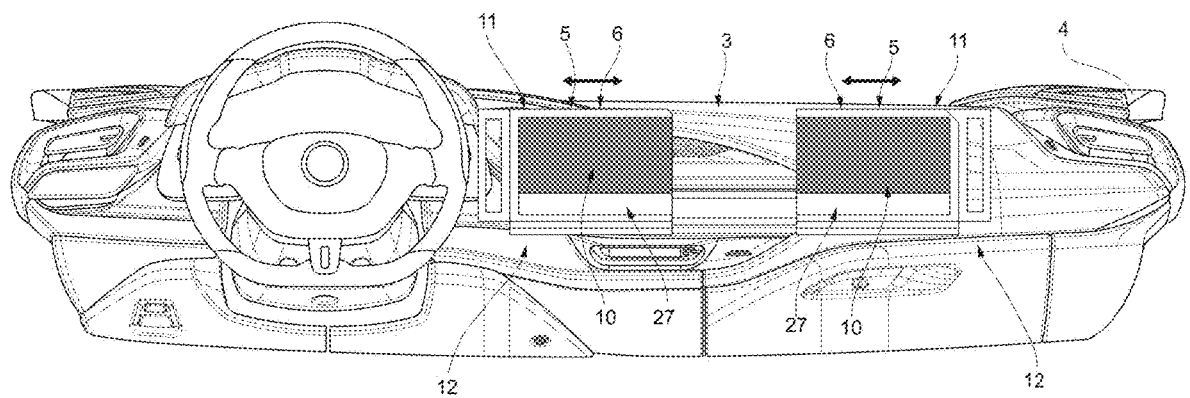
FIG. 10 is a frontal schematic view of a possible embodiment in which the central display device is composed of two sliding screens in a first configuration.
Figure 11:
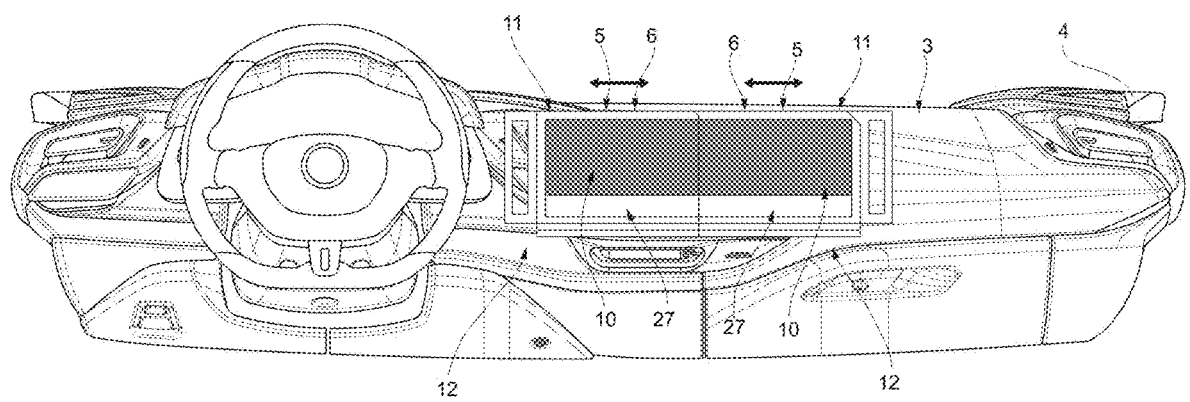
FIG. 11 is a frontal schematic view of the embodiment of FIG. 10 in a second configuration.

According to further non-limiting embodiments, like those illustrated in FIGS. 10 and 11, the movement system 11 is configured to translate the support element 9 along a linear guide which is at least partially transverse (in particular substantially parallel to the transverse axis T) and parallel to the floor F of the road vehicle 1.

Preferably but without limitation, the display device 5 comprises a manipulation element 12 configured to be grasped by a hand H of the driver DR (as can be seen in the non-limiting embodiment of FIG. 3) and/or of the passenger P to rotate the support element 9 at least between the second configuration in which the screen faces the driver DR and the third configuration in which the screen faces the passenger P (or vice versa) or to bring the support element 9 from said configurations to the first configuration with the screen parallel to the axis T (namely parallel to the surface of the vehicle dashboard 4).

According to some preferred non-limiting embodiments, the manipulation element 12 comprises a handle 13, which is integral with the support element 9 and is arranged below the screen 10, namely below a lower side 14 of the screen 10.

Preferably but without limitation, the handle 13 is made in one piece with the support element 9.

In particular, the handle 13 is obtained by means of a through opening 15 of the support element 9 configured to accommodate the hand H of the driver DR and/or of the passenger P.

In the non-limiting embodiment of FIGS. 2 to 4, the through opening 15 has a symmetrical shape, delimited by a closed curve.

Figure 6:
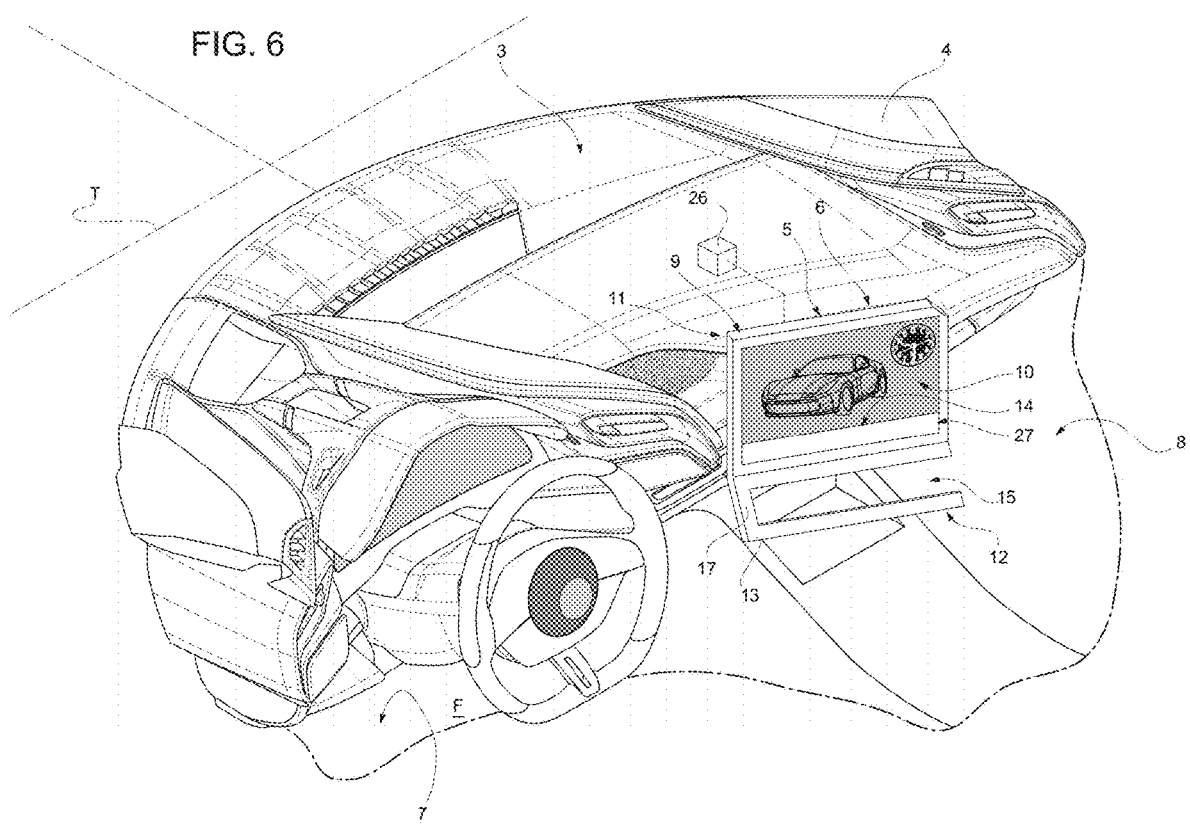
FIGS. 6 and 7 are perspective schematic views of part of the interior of the passenger compartment of the vehicle of FIG. 1 in which a central display device comprising a manipulation element according to further variations can be seen.
Figure 7:
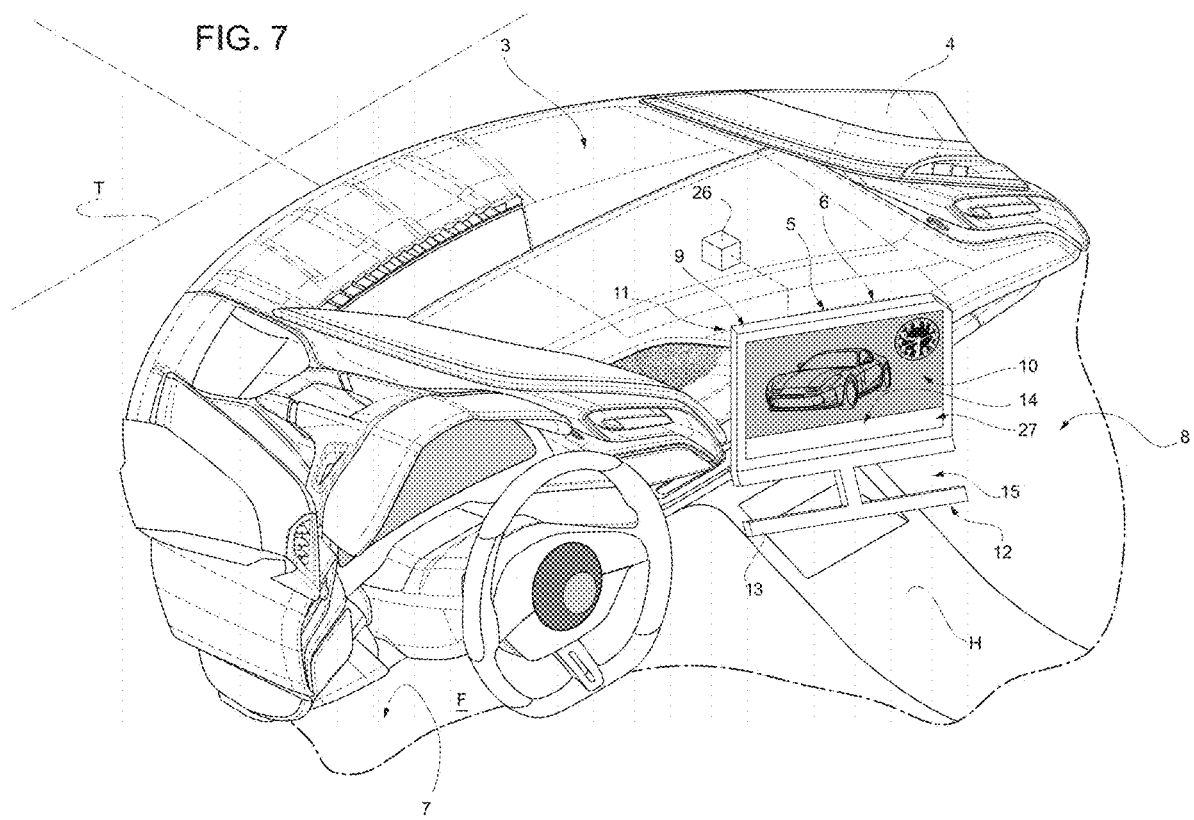
Figure 8:
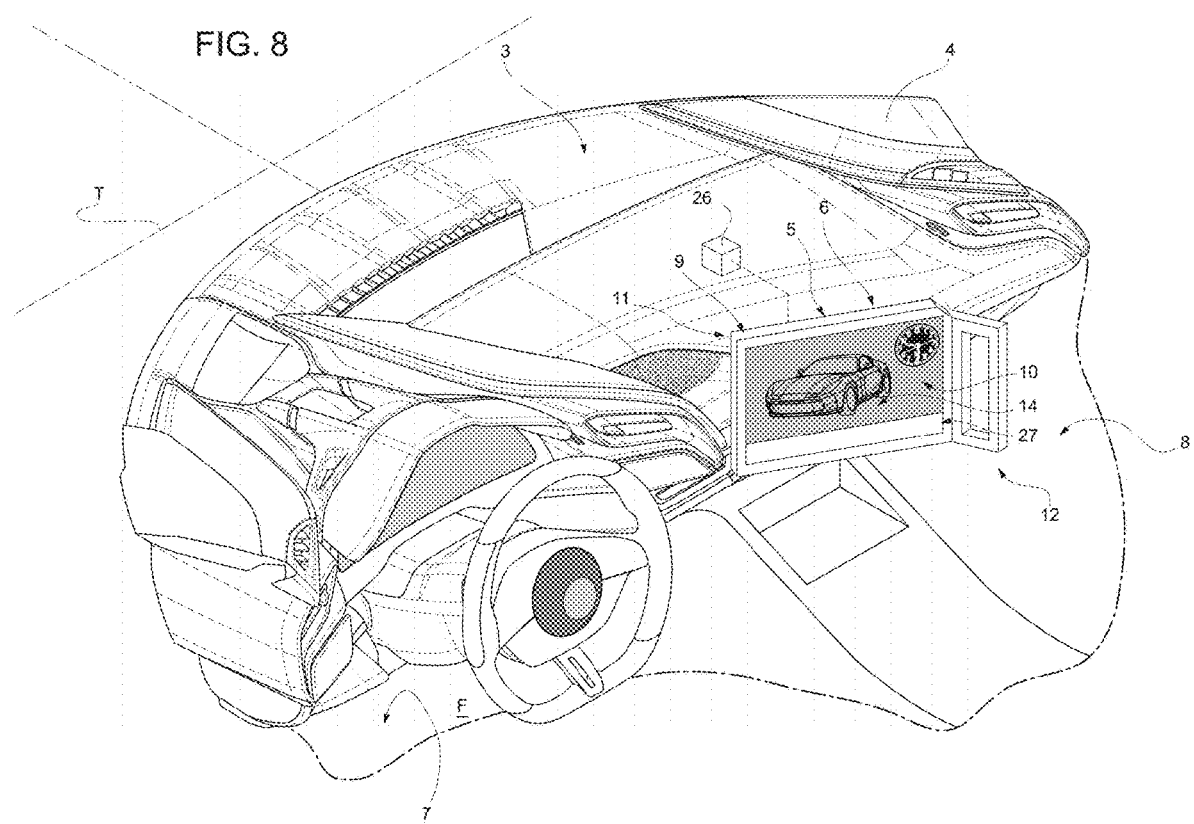
FIG. 8 is a perspective schematic view of part of the interior of the passenger compartment of the vehicle of FIG. 1 in which a central display device comprising a manipulation element arranged in a different position from FIG. 2 can be seen.

In other non-limiting embodiments, like those illustrated in FIGS. 6 and 7, the through opening 15 has an asymmetrical shape (FIG. 6) and/or a shape delimited by an open curve (FIGS. 6 and 7).

Preferably but without limitation, the opening 15 comprises two opposite rectilinear portions 16, connected to each other by two curvilinear portions 17, preferably circular (alternatively, as illustrated, the portions 17 can also be rectilinear, generating a rectangular through opening 15).

Figure 5:
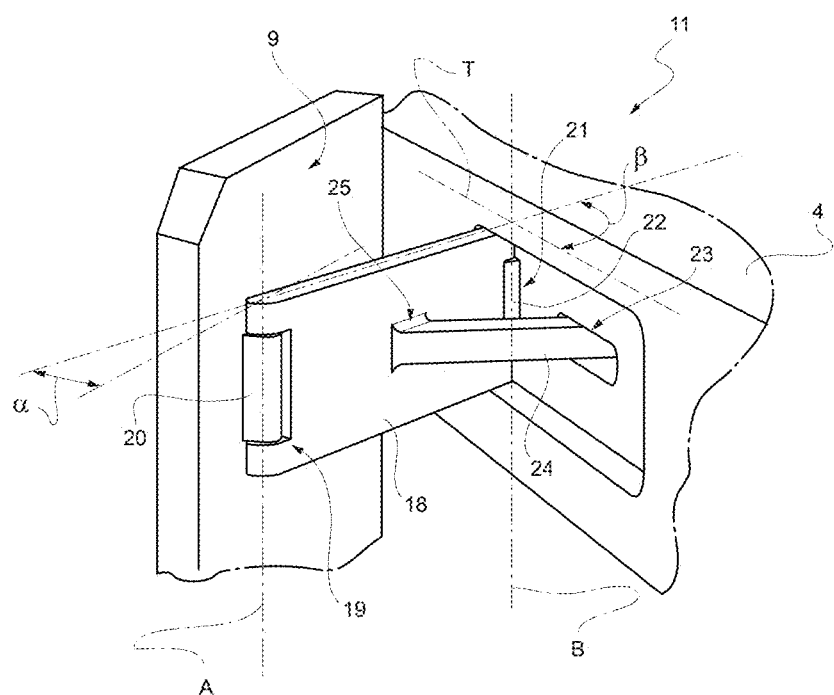
FIG. 5 is a perspective schematic view of a detail of the mechanism that connects the display device of FIGS. 2 to 4 to the vehicle dashboard.

According to the non-limiting embodiment of FIG. 5, the movement system 11 comprises at least a swing arm 18, of which a first end 19 is hinged, by means of a first hinge 20, to the support element 9, and a second end 21 is hinged, by means of a second hinge 22, to the dashboard 4 of the road vehicle 1.

In particular, the first hinge 20 is integral with the support element 9 and is configured to rotate (circularly, with the swing arm 18 as radius) around the second hinge 22 which is (once mounted) integral with the dashboard 4 of the road vehicle 1.

Advantageously but without limitation, the first hinge 20 and the second hinge 22 rotate respectively around a first axis A and around a second axis B, which are at least partially vertical.

Preferably but without limitation, the axis A and the axis B are parallel to each other.

According to some non-limiting embodiments not illustrated, the movement system 11 comprises a third hinge to allow a rotation of the screen 10 around a substantially horizontal axis. In this way, the driver DR or the passenger P can orient the screen 10 also in terms of their height, for optimal viewing.

According to the non-limiting embodiment of FIG. 5, the movement system 11 further comprises a support element 23, in particular comprising a support arm 24, which is connected at one end 25 to the swing arm 18 and is configured to distribute the weight of the display device 5 in an area 26 other than only the second hinge 22. This reduces the stress on the second hinge 22, prolonging the life and increasing the precision thereof.

In other non-limiting embodiments not illustrated, the support element 23 is not connected to the swing arm 18, but, for example, to the support element 9.

As previously mentioned, advantageously but without limitation, the first hinge is configured to generate a first relative rotary movement between the support element 9 and the swing arm 18 around the rotation axis A, and the second hinge is configured to generate a second relative rotary movement between the swing arm 18 and the vehicle dashboard 4 around the rotation axis B.

Advantageously but without limitation, the first relative movement allows rotation around the axis A by a first angle $\alpha$ and the second relative movement allows rotation around the axis B by a second angle $\beta$. In particular, the first angle $\alpha$ and the second angle $\beta$ are different from each other. Preferably but without limitation, the first angle $\alpha$ is greater than the second angle $\beta$.

In other words, the angle $\alpha$ corresponds to the angle between a longitudinal axis of the swing arm 18 and a longitudinal axis of the support element 9 (as illustrated in FIG. 5). Coherently, the angle $\beta$ corresponds to the angle between the longitudinal axis of the swing arm 18 and the transverse axis T or the axis of the surface of the vehicle dashboard 4 (also illustrated in FIG. 5). In other words, the angles $\alpha$ and $\beta$ are the angles of the respective relative movements starting from the first configuration (illustrated in FIG. 2) in which the dashboard 4, the swing arm 18 and the support element 9 are aligned with one another.

In particular, therefore, the movement system 11, without limitation, is a system with at least two degrees of freedom (provided by the hinges 20 and 22 in the embodiment of FIG. 5).

Alternatively or additionally, the movement system 11 comprises a degree of freedom provided by the linear transverse guide illustrated in FIGS. 10 and 11.

Figure 9:
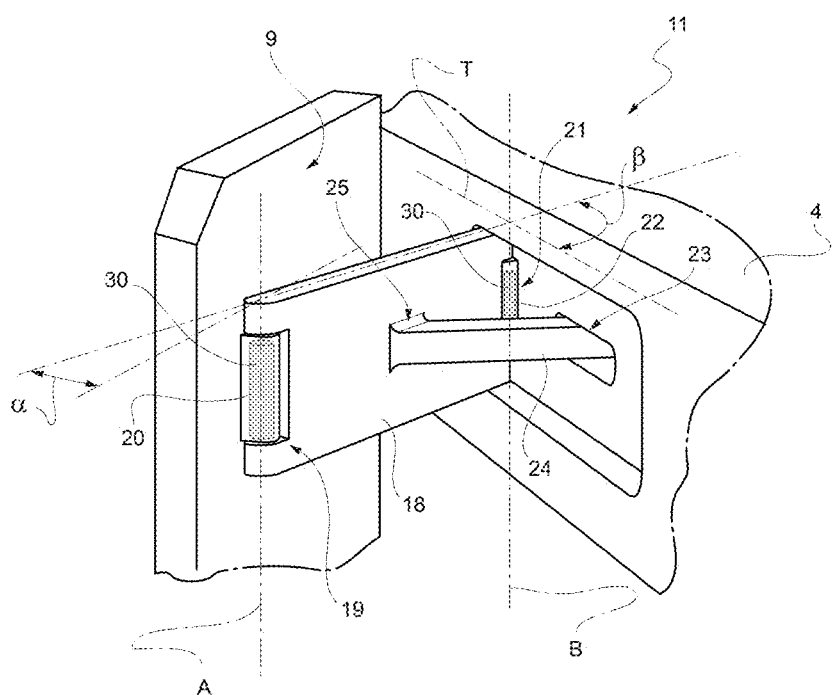
FIG. 9 is a perspective schematic view of a further embodiment of the detail of the mechanism of FIG. 5.

Advantageously but not necessarily, and as illustrated in the non-limiting embodiment of FIG. 9, the movement system 11 comprises at least one, preferably two, locking systems 30. The locking systems 30 are configured to keep in position the display device 5, namely the support element 9. In this way, it is possible to avoid abrupt repositioning (which can also harm the driver DR) of the display device 5 in the event of extreme vehicle dynamics (for example when braking, i.e. suddenly decelerating before a curve) or, even worse, in the event of an accident.

In some non-limiting cases the locking system 30 is a mechanical system, comprising springs and/or dampers that allow only slow movements of the movement system 11.

In other non-limiting cases, the locking system 30 comprises a servomotor which, for example, allows movement of the movement system 11 only below a certain speed or following an unlocking command by the driver DR.

In accordance with the above, preferably, the display device 5, in particular at the manipulation element 12, namely the handle 13, as illustrated in the non-limiting embodiment of FIG. 2, comprises at least an unlocking system 31, which allows the movement system 11 to be released from the locking system 30 to freely move the support element 9.

For example, advantageously but not necessarily, the unlocking system 31 is configured to enable the movement of the servomotors of the locking system 30 to move the support element around the hinges 20 and 22 and/or along the transverse guide illustrated in FIGS. 10 and 11.

According to some preferred non-limiting embodiments, the road vehicle 1 further comprises a control unit 26, which is configured to vary the contents shown by the display device 5 between the second configuration in which the screen 10 is inclined relative to the transverse axis T of the road vehicle 1 (namely relative to the surface of the dashboard 4) towards the driver DR, and the third configuration in which the screen 10 is inclined relative to the transverse axis T of the road vehicle 1 towards the passenger P.

In particular, in the second configuration (for example illustrated in FIG. 3) the control unit 26 commands the screen 10 to show driving-related content, for example a circuit, the speed, the lateral acceleration, the lap time, etc. On the other hand, in the third configuration (for example illustrated in FIG. 4) the control unit 26 commands the screen 10 to show distracting content such as videos, games, films, etc.

Advantageously but not necessarily, in passing from the third configuration to the second configuration or first configuration, the distracting content is automatically disabled.

According to some preferred non-limiting embodiments, the support element 9 further comprises mechanical commands 27, for example levers, buttons or knobs, which are interposed between the handle 13 and the screen 10. In this way, the driver DR can use said commands easily without distraction, using the handle 13 as a reference and/or support and perceiving by touch the operation of the command (differently from a touch control on the screen 10).

In the non-limiting embodiment of FIGS. 10 and 11, the display device 5 comprises two support elements 9 and two screens 10, which are separable from one another to show different content for the driver DR and for the passenger P respectively, or combinable, as illustrated in FIG. 11, to show a single extended content and substantially double the surface of the screen 10 that can be used by the driver.

In use, during driving, the driver DR can move by means of the handle 13 the support element 9 and therefore the screen 10, thus directing the latter towards himself and facilitating reading of the vehicle data, minimizing distraction from the track, for example. In the same way, the passenger P can direct the screen 10 towards himself (again using the handle). During this step, the control unit 11 enables the viewing of distracting content, preferably when the values of the angles $\alpha$ and $\beta$ are such that the screen 10 is not visible from the viewpoint of the driver DR, who therefore cannot be distracted by it.

Although the invention described above makes particular reference to a precise embodiment example, it should not be considered limited to said embodiment example, since its scope includes all the variations, modifications or simplifications covered by the attached claims such as, for example, a different type of road vehicle (for example with front wheel drive), a different shape of the passenger compartment, different movement systems, a different type of screen, etc.

The vehicle and the display device described above have numerous advantages.

Firstly, they reduce distraction of the driver when viewing the vehicle data and information, and when using the mechanical controls.

Furthermore, at the same time, the passenger can be entertained with content that would otherwise be distracting for the driver and should therefore be generally precluded during driving.

In addition, driver safety is guaranteed, preventing the display device from knocking or injuring the driver in the event of an accident, or in any case moving from the optimal position found, for example, with the vehicle at a standstill; it would be particularly difficult to find said position again during movement of the vehicle, especially during a race.

Lastly, the movement system allows a combination of two different screens if necessary, via which the surface viewable by the driver can be doubled or can be diversified from the content that can be viewed by the passenger if the two screens are separated.

LIST OF REFERENCE NUMBERS OF THE FIGURES 1 vehicle
2 wheels
3 passenger compartment
4 dashboard
5 display device
6 central portion
7 driving position
8 passenger position
9 support element
10 screen
11 movement system
12 manipulation element
13 handle
14 lower side
15 opening
16 rectilinear portions
17 curvilinear portions
18 swing arm
19 first end
20 first hinge
21 second end
22 second hinge
23 support element
24 support arm
25 end
26 control unit
27 mechanical controls
30 locking systems
31 unlocking systems
A axis
B axis
DR driver
F floor
H hand of the driver
P passenger
T transverse axis
α angle
β angle

The invention claimed is:

1. A content display device for a road vehicle; the content display device comprising:
    a support element configured to be mounted centrally at a dashboard of the road vehicle;
    at least one display screen, mechanically connected to the support element and configured to be visible to a passenger and/or a driver while driving;
    the content display device comprises a movement system hinged to the support element and hingeable to the dashboard for alternately rotating the screen towards the driver and/or towards the passenger, wherein the movement system further comprises a mechanical lock system to maintain the support element at a fixed position or provide slow movement thereto, wherein the movement system further comprises at least one swing arm, of which a first end is hinged, by means of a first hinge, to the support element, and a second end is hingeable, by means of a second hinge, to the dashboard of the road vehicle, and wherein the movement system further comprises an additional support element, which is connected to the swing arm and is configured to distribute the weight of the display device in an area other than only the second hinge; and
    the content display device further comprises a manipulation element configured to be grasped by a hand of the driver and/or the passenger to rotate the support element at least between a first configuration in which the screen faces the driver and a second configuration in which the screen faces the passenger.

2. The device according to claim 1, wherein the manipulation element comprises a handle, which is integral with the support element and is arranged below the screen.

3. The device according to claim 2, wherein the handle is made in one piece with the support element.

4. The device according to claim 3, wherein the handle is obtained by means of a through opening of the support element configured to accommodate the hand of the driver and/or the passenger.

5. The device according to claim 1, wherein the first hinge is integral with the support element and is configured to rotate around the second hinge, which is configured to be integral with the dashboard of the road vehicle.

6. The device according to claim 1, wherein the first hinge and the second hinge are rotatable about respective axes that are at least partially vertical.

7. A road vehicle comprising:
    four wheels, of which at least one pair of wheels is a pair of driving wheels;
    a passenger compartment configured to accommodate a driver and a passenger alongside the driver;
    a dashboard; and
    a content display device, the content display device comprising:
        a support element configured to be mounted centrally at the dashboard of the road vehicle;
        at least one display screen, mechanically connected to the support element and configured to be visible to the passenger and/or the driver while driving;
        a movement system hinged to the support element and hingeable to the dashboard for alternately rotating the screen towards the driver and/or towards the passenger, wherein the movement system further comprises a mechanical lock system to maintain the support element at a fixed position or provide slow movement thereto, wherein the movement system further comprises at least one swing arm, of which a first end is hinged, by means of a first hinge, to the support element, and a second end is hingeable, by means of a second hinge, to the dashboard of the road vehicle, and wherein the movement system further comprises an additional support element, which is connected to the swing arm and is configured to distribute the weight of the display device in an area other than only the second hinge; and a manipulation element configured to be grasped by a hand of the driver and/or the passenger to rotate the support element at least between a first configuration in which the screen faces the driver and a second configuration in which the screen faces the passenger.

8. The road vehicle according to claim 7, wherein the first hinge is integral with the support element and is configured to generate a first relative and rotary movement between the support element and the swing arm, and wherein the second hinge is integral with the vehicle dashboard and is configured to generate a second relative and rotary movement between the swing arm and the vehicle dashboard.

9. The road vehicle according to claim 8, wherein the first relative movement allows rotation around a first axis by a first angle and wherein the second relative movement allows rotation around a second axis by a second angle, the first angle being greater than the second angle.

10. The road vehicle according to claim 7, wherein the movement system is configured to rotate the support element about an axis at least partially transverse to a floor of the road vehicle.

11. The road vehicle according to claim 7 further comprising a control unit, wherein the control unit is configured to vary the contents displayed by the display device between a first configuration in which the screen is inclined, with respect to a transverse axis of the road vehicle, towards the driver to provide driver-related content, and a second configuration in which the screen is inclined, with respect to the transverse axis of the road vehicle, towards the passenger to provide distracting content.

* * * * *